UNITED STATES PATENT OFFICE.

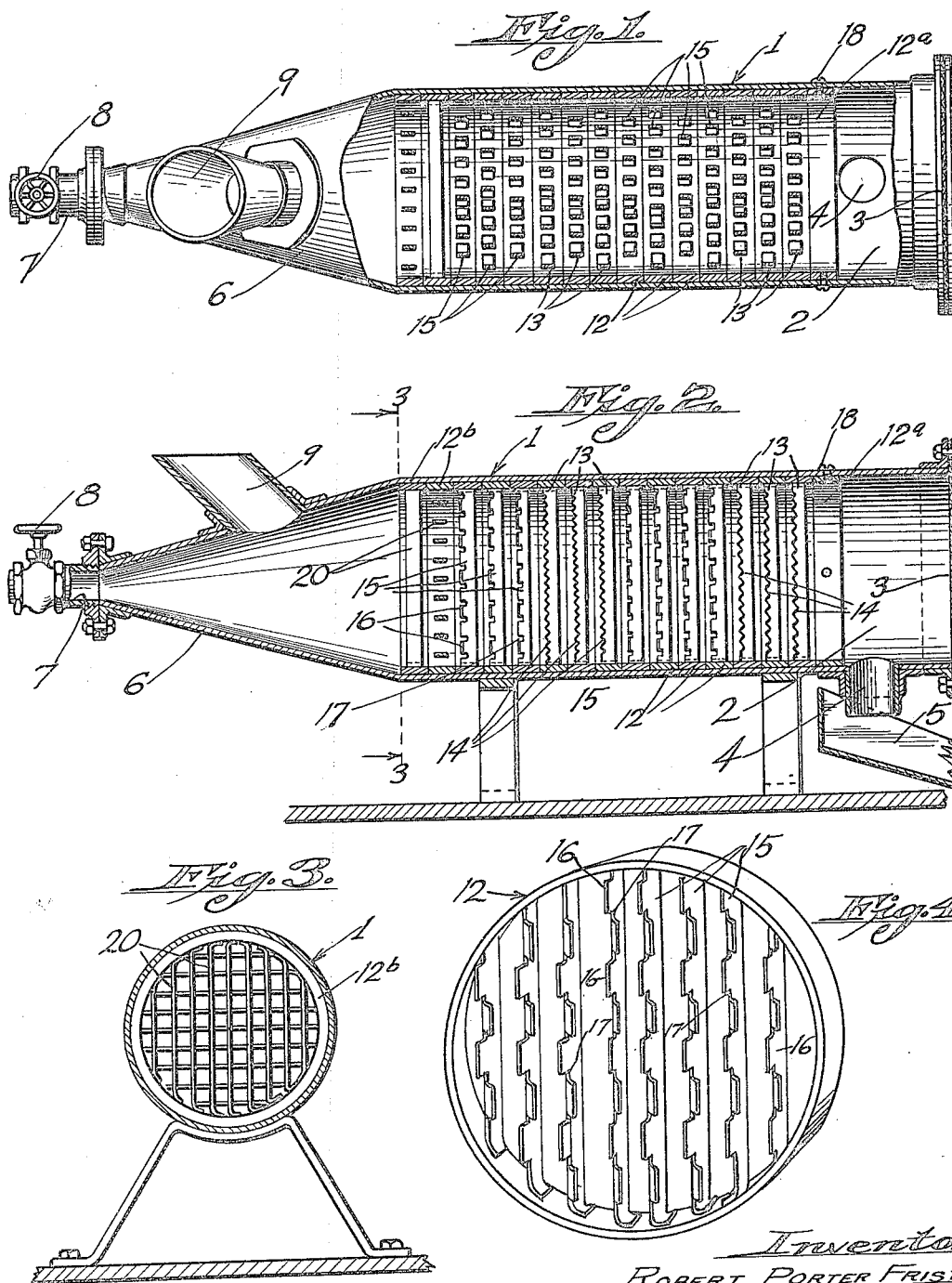

ROBERT PORTER FRIST, OF LONG BEACH, CALIFORNIA.

STEMMER FOR DECIDUOUS FRUIT.

1,403,399.  Specification of Letters Patent.  Patented Jan. 10, 1922.

Application filed March 31, 1921. Serial No. 457,196.

*To all whom it may concern:*

Be it known that I, ROBERT PORTER FRIST, a citizen of the United States, residing at Long Beach, in the county of Los Angeles and State of California, have invented new and useful Improvements in Stemmers for Deciduous Fruit, of which the following is a specification.

This invention is a device for removing stems from deciduous fruits and the like, wherein the fruits are forced through a passageway as by an air blast, and through suitable impingement elements in the form of screens which are arranged to pull the stems from the fruits and permit said stems to be discharged through a separating screen at the end of the passageway, while retaining the fruits within the passageway so that they may be collected through a discharge spout, preferably at the base of the passageway.

The invention will be readily understood from the following description of the accompanying drawings, in which—

Figure 1 is a plan view of the device constructed in accordance with the invention, partly broken away.

Fig. 2 is a vertical longitudinal section through the apparatus.

Fig. 3 is a transverse section on the line 3—3 of Fig. 2.

Fig. 4 is a perspective view of one of the impingement elements of the device.

The improved apparatus includes a passageway for the fruits, which in the present instance is shown as a cylindrical member 1 having an open discharge end 2 covered by a screen 3, and also provided with a discharge spout 4 at the bottom of the cylinder adjacent the discharge end of the latter. The discharge spout may communicate with a suitable hopper or trough 5 through which the fruit is removed after the stems have been separated from the same.

The opposite end of the cylinder 1 forms an intake end, and preferably comprises a convergently tapering end member 6 which is connected to a supply pipe 7 having a control valve 8 therein in order that a blast of air may be forced through the cylinder and outwardly through the discharge end of the same. An intake for fruit is preferably arranged in intake member 6 at the upper portion of the latter, and so that the fruit will be discharged into the cylinder within the path of the air blast. The fruit intake is shown as a usual hopper 9.

The impingement elements adapted to engage the fruit passing through cylinder 1 so as to pull the stems from the fruits, are preferably arranged as elements adapted to be separably removed and replaced. Each unit of the impingement elements comprises a frame 12 fitting within cylinder 1 and carrying abutment means within the same. In certain of the frames 12 parallel transverse plates 13 are positioned and are provided with toothed edges 14 at the edges thereof which are turned toward the advancing fruits. Certain others of the frames 12 are provided with parallel transverse bars 15 having the edges thereof, which are turned toward the advancing fruits, provided with lips 16 alternately curved to opposite sides, as clearly shown in Fig. 4, so as to form angles 17 between said lips which are arranged to engage the stems of the fruits passing through the apparatus.

The frames carrying bars 13 and 15 are so positioned that bars 13 and 15 will extend in substantially vertical position and parallel to one another so as to form parallel vertical spaces between the same extending the length of cylinder 1 and arranged for the passage of the fruits.

At the discharge end of cylinder 1, the frames 12 are held in position by means of a retaining frame 12ª adapted to be received within cylinder 1 and held in position by means of a usual set screw 18. At the intake end of the apparatus the frames 12 are held in position by means of frames 12ᵇ which are received within the end of the cylinder and which carry parallel transverse bars 20 provided with smooth edges and arranged so that the bars of the two frames 12ᵇ are positioned at right angles to one another, in order to form rectangular apertures for the passage of the fruits forced through cylinder 1 by the air blast.

It will be noted that the passage of the fruits through the openings formed by the bars of frames 12ᵇ will separate the fruits and properly position the same so as to readily pass through the vertical parallel passageways defined by the bars of frames 12. As the fruits pass through these latter passageways the stems of the same, by engaging in the angles 17 formed by the lips 16 or by catching upon the teeth 14, will be pulled from the fruits as they are forced through the apparatus by the air blast, and as a consequence when the fruits reach the discharge end of the apparatus, the stems, drawn therefrom, are adapted to be discharged through screen 3 by the air blast, while the fruits being of such size as to be held within the apparatus by screen 3, will drop to the bottom the cylinder 1 so as to discharge through spout 4 to the trough 5.

It will thus be seen that I have provided an extremely simple apparatus arranged for the ready removal of stems from deciduous fruits and the like, and also so constructed that the stems, when removed, may be readily discharged while permitting of the collection of the fruits.

Various changes may be made without departing from the spirit of the invention as claimed.

What is claimed is:

1. A device of the character described comprising a passageway, means for forcing fruit and the like through the passageway, means for separating the fruits from one another, and impingement elements engaged by the fruits for pulling stems from the same.

2. A device of the character described comprising a passageway, means for forcing fruit and the like through the passageway, and impingement elements comprising units detachably mounted in said passageway and arranged to be engaged by the fruit for pulling stems from the same.

3. A device of the character described comprising a passageway, means for forcing fruit and the like through the passageway, and impingement elements comprising transverse bars having angle forming edges adapted to engage the stems of the fruit for pulling the stems from the fruit.

4. A stemming apparatus comprising a receptacle, means for forcing fruit through the receptacle, and means in the receptacle operating to grip the stems of the fruit so that under the action of the first means the fruit will be removed from the stems.

5. A stemming apparatus comprising a receptacle, fluid means for forcing fruit through the receptacle, and means in the receptacle operating to grip the stems of the fruit so that under the action of said fluid means the fruit will be moved from the stems.

6. A stemming apparatus comprising a receptacle, pneumatic means for forcing fruit horizontally through the receptacle, and means in the receptacle operating to grip the stems of the fruit so that under the action of said pneumatic means the fruit will be removed from the stems.

7. A stemming apparatus comprising a receptacle through which fruit is adapted to pass, and impingement elements having angle forming edges adapted to engage the stems of the fruit for pulling the stems from the fruit.

8. A stemming apparatus comprising a receptacle, impingement elements within the receptacle and arranged one in advance of the other to successively intercept the passage of fruit through the receptacle, and fluid means for forcing fruit through the receptacle so as to be successively engaged by said elements.

9. A stemming apparatus comprising a receptacle, and impingement elements within the receptacle, certain of said elements being formed with angle forming lips and the remaining elements having toothed edges.

10. A stemming apparatus comprising a receptacle, and impingement elements within the receptacle, certain of said elements being formed with angle forming lips and the remaining elements having toothed edges, the lipped and the toothed elements being arranged in alternate groups.

In testimony whereof I have signed my name to this specification.

ROBERT PORTER FRIST.